Sept. 29, 1970  C. J. TROTTIER ET AL  3,531,077
BEARING ASSEMBLY FOR A SWING STRUCTURE
Filed April 7, 1969
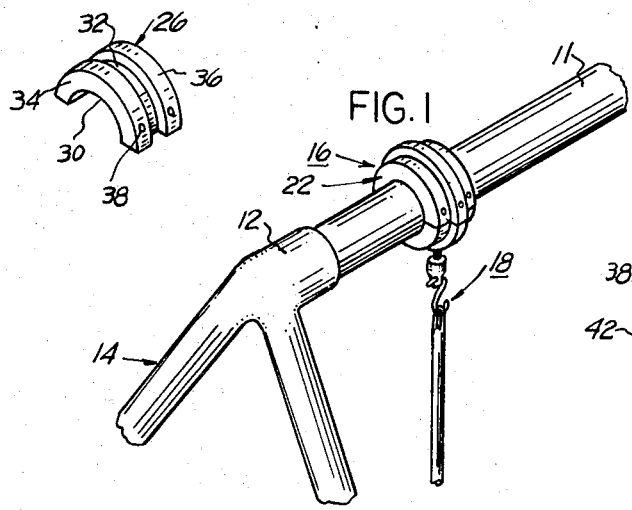
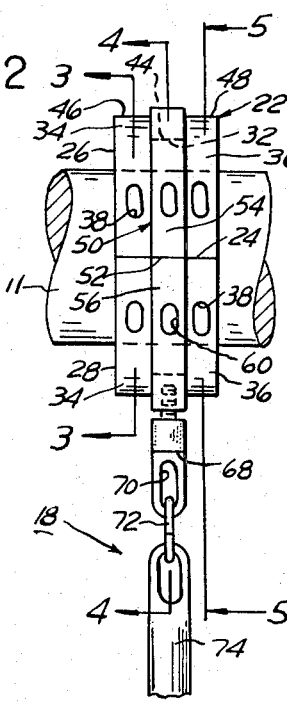
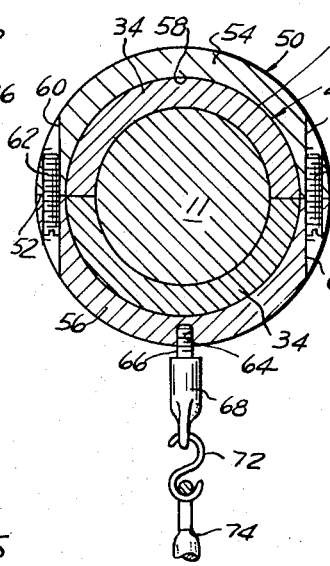
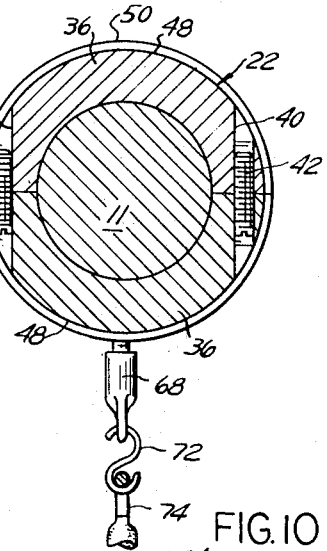
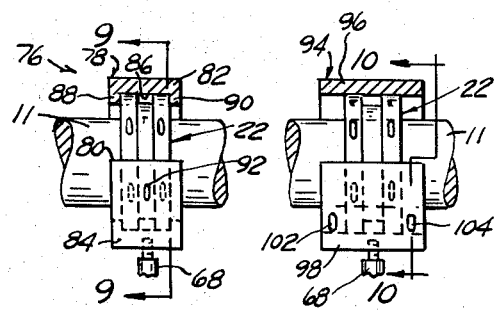
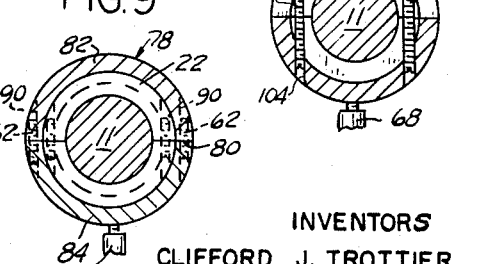
INVENTORS
CLIFFORD J. TROTTIER
DAVID A. TROTTIER
BY Hauke, Krass, Gifford, & Patalidis
ATTORNEYS

United States Patent Office 3,531,077
Patented Sept. 29, 1970

3,531,077
BEARING ASSEMBLY FOR A SWING STRUCTURE
Clifford J. Trottier, 8155 Huntington, Westland, Mich. 48155, and David A. Trottier, 30772 Rush, Garden City, Mich. 48135
Filed Apr. 7, 1969, Ser. No. 813,916
Int. Cl. F16m 13/00
U.S. Cl. 248—370                                      12 Claims

ABSTRACT OF THE DISCLOSURE

A bearing assembly for swings or similar playground or exercise equipment is attached to an overhead cross bar for the support and swinging or pivoting engagement with a hanger supporting the equipment. The bearing assembly includes a split inner race in the form of a double flanged collar which is fixed to the cross bar by means of tangentially fixed screws which pass through the flanged portions of both halves of the split inner race. The inner race accepts an outer race which is likewise split and loosely secured to the inner race by means of screws which extend tangentially through both halves to prevent the outer race from axial displacement relative to the inner race. Swing hangers or suspension bars are removably attached to the outer race.

BACKGROUND OF THE INVENTION

Field of the inventioin

The invention relates to playground, amusement or exercising devices utilizing equapment pivotally suspended from a cross bar for swinging operation thereon and more particuarly to a bearing assembly for the pivotal connection of the equipment to the cross bar.

Description of the prior art

Swing assemblies are widely known and are usually composed of spaced standards or legs which rest on the ground and have their upper ends connected by a cross bar or tubing or rod. The swinging equipment is normally pivotally suspended from the cross bar between the leg supports of the assembly.

In known swing devices of this kind, the pivot bearings of the swings have been variously constructed of plain sleeves or bushings rotating directly on the cross bars, antifrictioin bearings such as balls or rollers, or compound bushings formed of an inner sleeve and an outer sleeve.

Plain bushings secured for rotation directly on the cross bar are highly objectionable in that they cause extreme wearing and localized stresses on the cross bars and eventually cause the cross bars to bend at or between the bearing points, making the bearing inoperable.

Anti-friction bearings, such as balls or rollers, are likewise objectionable. In addition to the increased cost of these bearings, they are inefficient in that the balls or rollers will quickly pit the bearing races causing a jerky and noisy operation of the swings, and thus require frequent replacement. This is due to extreme loading of only a certain number of the balls or rollers since the bearings are never required to rotate through 360° as is desired in anti-friction bearing applications. Thus, only the balls or rollers positioned in the upper half of the bearings are required to carry all the load, whereas the remaining balls or rollers in the lower half of the bearing carry only a minimal load or no load at all.

Known compound plain bushing assemblies for swing devices have been found to be deficient in that they are difficult to assemble and disassemble and make no provision for wear adjustment. Additionally, they are constructed so that a given outer race will only fit on a certain inner race. Thus, it is not possible to selectively vary the size of the load carrying bearing surfaces as often has been found to be desirable, since in light load applications the bushings can be made of smaller widths than in heavy duty applications to reduce the cost. Conventionally, the swing seat or other equipment is suspended from the cross bar on chains or ropes attached to a pair of spaced bearings. The use of chains, ropes or other flexible suspension means is objectionable in that they easily get tangled and due to their flexibility they twist easily at any point along their length making it difficult for the user to always maintain a straight swinging movement. They are also of certain danger to users of the equipment if permitted to dangle wildly in different directions other than in the normal swinging direction. For this reason, rigid hanger bars have been proposed for suspension of the swing equipment and the present invention is of particular utilization in connection with solid hanger or suspension bars.

Accordingly, the present invention provides an improved bearing construction to overcome the disadvantages of the prior art as set forth above.

SUMMARY OF THE INVENTION

The improved pivot bearing of the present invention is comprised of an inner bearing race constructed in the form of a split collar and having radial external bearing surfaces located on two different diameters. The split collar is constructed to provide an intermediate portion positioned between two opposite flange portions of larger diameters in which both the intermediate portion and the flange portion provide radial external bearing surfaces for outer bearing races of different widths and diameters. The split collar inner bearing race is adapted to be attached non-rotatably and non-movably to the ridge pole or cross bar of the swing by means of tangentially positioned recessed screws, such as headless Allen screws.

The outer bearing races may be variously constructed in the form of split rings or sleeves and be of various widths and have internal bearing surfaces of varying diameters corresponding to the different external bearing surface diameters of the stationary inner bearing race. In one embodiment, the outer bearing race is a split ring adapted for rotation around the intermediate portion of the stationary inner bearing race between two flanged portions and in another embodiment, the outer bearing race is a split sleeve of desired width which is larger than the width of the stationary inner bearing race and which has internal bearing surfaces of a diameter corresponding to the diameter of the opposite flanged portions of the stationary inner race for rotation thereon.

In each of the embodiments, the two halves of the outer bearing races are secured by recessed screws extending tangentially through the walls of the ring or sleeves to loosely retain the outer races on the inner races and to provide means to prevent the outer races from axial displacement relative to the center line of the inner race.

This arrangement also provides a convenient means of bearing adjustment to compensate for wear.

The improved bearing structure further provides means for detachably securing the hanger bars from which the swing equipment is suspended, to the outer races for pivotal movement therewith.

Thus, the improved structure can be easily and quickly assembled and disassembled to facilitate the erection of commonly used "knock-down" swing constructions.

Additional novel features and advantages of the improved bearing structure will be readily apparent upon review of the following detailed description of several preferred embodiments of the invention.

BRIEF DESCRIPTION OF THE DRAWINGS

The preferred embodiments are clearly illustrated in the accompanying drawings, in which:

FIG. 1 is a fragmentary perspective illustration of a portion of the cross bar incorporated in a swing construction embodying the improved bearing structure;

FIG. 2 is a front view of the bearing structure shown in FIG. 1;

FIG. 3 is an enlarged cross section through the bearing structure shown in FIG. 2 as seen along line 3—3 thereof;

FIG. 4 is a similarly enlarged cross section of the bearing structure shown in FIG. 2 as seen along line 4—4 thereof;

FIG. 5 is a cross section similar to FIGS. 3 and 4 taken along line 5—5 of the bearing structure shown in FIG. 2;

FIG. 6 is a perspective illustration of one-half of the split inner bearing race of the bearing structure shown in FIGS. 1 and 2;

FIG. 7 illustrates another embodiment of the present invention;

FIG. 8 is a further embodiment of the present invention;

FIG. 9 is a side view of the bearing structure shown in FIG. 7; and

FIG. 10 is a partial cross section through the bearing structure shown in FIG. 8.

DESCRIPTION OF THE PREFERRED EMBODIMENTS

Referring to FIGS. 1–6 of the drawings, FIG. 1 shows a fragmentary portion of a conventional "knock-down" swing construction provided with the usual ridge pole or cross bar 11 supported at its end in a socket 12 at the upper end of an A-frame which supports the swing construction on the ground. The present improved bearing structure 16 is attached to the cross bar 11 to pivotally support the swing seat suspension member 18.

Referring to FIGS. 2–6, the bearing structure 16 comprises an inner bearing race 22 split along its diameter, as at 24, to provide identical semi-circular halves 26 and 28 respectively, one of which is shown in a separate view in FIG. 6. Both inner race halves have an internal radial surface 30 for engagement with the cross bar 11 and are each provided with a radial groove 32 intermediate their ends. The portions adjacent the groove 32 include spaced opposite flange portions 34 and 36, each provided with aligned threaded tangential apertures 38 and 40 at opposite sides of their centers which, in assembly, are adapted to receive screw fastening means 42, preferably headless Allen screws, for clamping securement of the two halves 26 and 28 around the cross bar 11, as shown in FIGS. 3 and 5.

The radial surface 44 of the intermediate radial groove 32 provides a first external bearing surface for an outer bearing race and the spaced radial surfaces 46 and 48 of the flange portions 34 and 36 provide a second external bearing surface for a different outer bearing race of larger diameter and width so that selectively, depending on the required load capacity, either bearing surface 44 or bearing surfaces 46 and 48 may be used as described in the following.

FIGS. 2 and 4 illustrate the employment of an outer bearing race for use in conjunction with the intermediate bearing surface 44 having a smaller diameter and width relative to the bearing surfaces 46 and 48.

As illustrated in FIGS. 2 and 4, the outer bearing race 50 is comprised of a ring split along its diameter, as at 52, to provide identical ring halves 54 and 56, each having an internal radial bearing surface 58 adapted for rotating engagement with the radial bearing surface 44 of the groove 32 of the inner race 22. The ring 50 is preferably of slightly narrower width than the groove 32 for substantially frictionless rotation between the flange portions 34 and 36 which, in assembly, act as retainers to prevent the outer race 50 from axial displacement. The ring halves 54 and 46 are provided with aligned tangential threaded apertures 60 similar to the apertures 38 and 40 in the inner bearing race for the receipt of Allen screws 62. In assembly, ring halves 54 and 56 are placed in the groove 32 for matching engagement with each other and are clamped together by means of the Allen screws 62. The clamping force on the bearing surface 44 can be adjusted as desired by loosening or tightening of the screws 62 so as to obtain the most desirable bearing fit without binding. Wear at the bearing surfaces 44 and 58 can be accommodated by the same procedure.

The lower ring half 56 of the outer bearing race is provided with a centrally threaded aperture 64 to receive the threaded shank 66 of a fitting 68, which has a slot 70 at its outer end for engagement with one end of a hook 72. The other end of the hook 72 is adapted to be selectively attached to a swing suspension means 18, such as a suspension rod 74, as illustrated in FIGS. 2, 4 and 5. The rigid suspension rod or bar 74 is preferably fabricated to be adjustable in length to accommodate various height requirements of the swing seat or other equipment. By this arrangement, the swing equipment (not shown) usually supported at the end of the suspension means 18 may be pivoted or swung around the cross bar 11 through attachment to the outer bearing race 50 which freely rotates within the groove 32 in the stationary inner bearing race 22.

A different embodiment of an outer bearing race is illustrated in FIGS. 7 and 9 utilizing the same inner bearing race 22.

The outer bearing race 76 shown in FIGS. 7 and 9 comprises a sleeve 78 which is split along its diameter as at 80 to provide two identical sleeve halves 82 and 84, which each have an inner bearing surface 86 adapted for rotating support on the spaced external bearing surfaces 46 and 48 of the flanged portions 34 and 36 of the inner race 22. Both sleeve halves are further provided with internal flange means 88 and 90, which are spaced apart a distance slightly more than the overall width of the inner bearing race 22 for free rotation of the sleeve around the inner race flanges 34 and 36. In assembly, the sleeve flanges 88 and 90 provide a retaining means for the sleeve 78 to prevent any axial displacement relative to the inner race 22. The two sleeve halves 82 and 84 are similarly provided centrally thereof with aligned, tangential apertures 92 for the receipt of Allen screws to clamp the two sleeve halves together around the bearing surfaces 46 and 48 of the inner race in such manner as to obtain maximum bearing contact. The lower sleeve half 84 is provided with a centrally threaded aperture to receive the suspension fitting 68 for the purpose described in detail in connection with FIGS. 2–5.

This bearing structure provides an increased load capacity due to the increase in the bearing contact surface, which is approximately double that of the embodiment illustrated in FIGS. 2–5. To achieve this added load capacity, only the outer bearing race needs to be exchanged, whereas the inner bearing race is retained, thus considerably reducing the costs otherwise encountered in exchanging a complete bearing assembly.

A further embodiment utilizing some of the features of FIGS. 7 and 9 is illustrated in FIGS. 8 and 10. In this embodiment the outer bearing race is comprised of a sleeve 94 similar to the sleeve 78 with the exception that the internal side flanges 88 and 90 have been eliminated. The sleeve 94 is similarly composed of two identical sleeve halves 96 and 98 which, in assembly, comprise an internal bearing surface 100 adapted for rotating engagement around the external bearing surfaces 46, 48 on the flange portions 34, 36 of the inner race 22.

With particular reference to FIG. 10, in order to prevent axial displacement of the sleeve 94 relative to the inner race 22, a pair of spaced, aligned, tangential threaded apertures 102 and 104 are provided for the receipt of screws 62 to clamp the two sleeve halves together. The spacing between the apertures 102 and 104 substantially corresponds to the overall width of the inner race 22 and they are located closer to the axial center of the bearing structure, as shown in FIG. 10. In this arrangement, when the Allen screws 62 are in place they abut against the outside of the flange portions 34 and 36 of the inner race and thereby prevent the sleeve 94 from axial displacement relative to the inner race 22.

All of the bearing surfaces may be provided of known bearing materials, such as bronze, graphite, babbit or the like, or they may be coated with a plastic material. Both the inner and outer races could be made of any hard wear and corrosion resistant synthetic material, such as nylon, Teflon and the like. This construction would be of particular advantage in outdoor usage of the bearing to combat corrosion and, since these materials are mostly self-lubricating, the bearing assembly needs little or no maintenance.

As mentioned before, the improved bearing structure herein disclosed is of particular advantage with the use of rigid suspension bars rather than with flexible suspensions, such as chains, cables and the like, to prevent twisting and entanglement of the suspension means.

It will be seen from the foregoing detailed description that by the present invention an improved, rugged pivot bearing structure has been provided which has particular use in connection with a swing construction and which provided high-load capacity and is wear resistant.

The bearing structure is constructed such as to enable the interchange of the rotating outer races for varying load capacities without change or modification of the stationary inner race.

The bearing structure, due to its ease of assembly and disassembly, is particularly adaptable for use in "knock-down" swing structures.

We claim:

1. A pivot bearing structure providing an inner bearing member and an outer bearing member rotatable relative to each other, said inner bearing member comprising:
   a sleeve split along the diameter to form identical sleeve halves, said sleeve providing in assembly a radial groove defined by axially spaced flanged portions of greater diameter, said groove and flange portoins having external radial bearings surfaces of different diameters and means to clamp said sleeve halves together in opposed relation to form a bearing unit;
   said outer bearing member comprising:
   a ring split along its diameter to form identical ring halves, said ring having an internal bearing surface adapted for rotating engagement with at least one of said external bearing surfaces of said sleeve, and
   means to adjustably clamp said ring halves together around said sleeve in rotatable bearing contact therewith.

2. The bearing structure as defined in claim 1, in which said outer bearing member comprises a ring having a width slightly less than the width of said radial groove of said sleeve for insertion therein in rotatable bearing relationship whereby said flange portions of said sleeve prevent said ring from axial displacement relative to said sleeve.

3. The bearing structure as defined in claim 1, in which said outer bearing member comprises a ring of a width wider than the width of said sleeve and having a diameter comprising an internal bearing surface adapted to be in rotatable bearing contact with said external bearing surfaces of said axially spaced flange portions of said sleeve.

4. The bearing structure as defined in claim 1, in which said means to clamp said ring halves together are adapted in assembly to laterally abut against said flanged portions of said sleeve to prevent said ring from axial displacement relative thereto.

5. The bearing structure as defined in claim 3, in which said ring is provided at both ends with internal flanges adapted for lateral abutment against said flange portions of said sleeve to retain said ring on said sleeve.

6. The bearing structure as defined in claim 1, in which said outer bearing member is provided with means for detachable securement of a suspension means thereto for pivotal rotation therewith.

7. The bearing structure as defined in claim 1, in which said means to clamp said sleeve halves and said ring halves together comprise recessed screws extending tangentially through both said halves.

8. In combination with a swing assembly composed of a supporting frame having a cross bar attached thereto for pivotal support of the swing equipment, a bearing structure for said swing equipment comprising:
   an inner race and an outer race relatively rotatable around said inner race, said inner race being nonrotatably attached to said cross bar and provided with a plurality of external bearing surfaces of different diameters,
   said outer race comprising a ring member adapted for rotating engagement with at least one of said plurality of bearing surfaces,
   means for restricting axial movement of said outer race relative to said inner race, and
   means associated with said outer race to directly attach said spring equipment to said outer race.

9. In the combination as defined in claim 8, said means to restrict axial movement of said outer race comprising a radial groove within said inner race adapted to receive said outer race.

10. The combination as defined in claim 8, in which said means to restrict axial movement of said outer race comprises opposite internal flanges on said outer race adapted for abutment against lateral surfaces of said inner race.

11. In the combination as defined in claim 8, in which said means to restrict axial movement of said outer race comprises screw means extending through said outer race in a tangential direction adapted for abutment against lateral surfaces of said inner race.

12. In the combination as defined in claim 8, in which said means to attach said swing equipment to said outer race comprises a threaded aperture aligned with the center of said outer race adapted to receive a fitting for selective attachment of said swing equipment thereto.

References Cited

UNITED STATES PATENTS 1,646,160  10/1927  Milan.
2,638,967  5/1953  Morton.

EDWARD C. ALLEN, Primary Examiner

U.S. Cl. X.R.
308—37, 161